United States Patent

Hwo et al.

[11] Patent Number: 5,889,121
[45] Date of Patent: Mar. 30, 1999

[54] METHOD FOR IMPROVING PROCESSABILITY OF THERMOPLASTICS

[75] Inventors: Charles C. Hwo; Mark L. Kasakevich, both of Sugar Land; Jerry W. Secrist, Houston, all of Tex.

[73] Assignee: Shell Oil Company, Houston, Tex.

[21] Appl. No.: 726,185

[22] Filed: Oct. 4, 1996

Related U.S. Application Data

[60] Provisional application No. 60/004,937 Oct. 6, 1995.
[51] Int. Cl.[6] ...................................................... C08L 23/00
[52] U.S. Cl. ............................................................. 525/240
[58] Field of Search ............................................. 525/240

[56] References Cited

U.S. PATENT DOCUMENTS 5,663,236   9/1997   Takahashi et al. ...................... 525/240

FOREIGN PATENT DOCUMENTS 598626   5/1994   European Pat. Off. .
9308221  4/1993   WIPO .

*Primary Examiner*—David W. Wu
*Attorney, Agent, or Firm*—Y. Grace Tsang

[57] ABSTRACT

The use of a minor amount of poly-1-butene for improving the processability or extrusion efficiency of a metallocene-made thermoplastics, particularly metallocene-made low density polyethylene, by adding about 0.1–15 wt % of poly-1-butene to the metallocene-made thermoplastics which are melt incompatible with the poly-l-butene prior to processing.

7 Claims, No Drawings

METHOD FOR IMPROVING PROCESSABILITY OF THERMOPLASTICS

This application claims the benefit of provisional application No. 60/004937 filed Oct. 6, 1995.

FIELD OF THE INVENTION

This invention relates to a means for improving the processability or extrusion rate of a metallocene-made thermoplastic by incorporating a polybutene-1 into a melt incompatible metallocene-made thermoplastic polymer, specifically a metallocene-made polyethylene, more specifically a metallocene-made low density polyethylene.

BACKGROUND OF THE INVENTION

Metallocenes make polymers with uniform, narrow molecular weight distribution (MWD), high comonomer content, relatively even comonomer distribution and an enormously wide choice of comonomers, compared to multi-site Ziegler-Natta catalysts.

It is known that a variety of metallocene-made thermoplastic polymer have excellent properties, but lack good melt processability. Higher toughness and good melt strength are attributes of higher molecular weight grades, and as a result, melt processing machine outputs tend to be inversely related to the desirable qualities of toughness needed for durable goods, etc. and melt strength needed for film, thermoforming, blow molding, injection molding, etc.

European Patent Application No. 455,481, having Shell Oil Company as the applicant, discloses the use of a high melt index poly-1-butene to thermoplastic polymers made by conventional Ziegler-Natta catalysts to improve the processability of the thermoplastic polymers made by conventional Ziegler-Natta catalysts.

However, there remains a need for improving the processability of thermoplastics made by metallocene catalysts, which differ from the conventional Ziegler-Natta catalyst made thermoplastics.

Moreover, it has been found that the addition of poly-1-butene to low density polyethylene does not improve the processability of the low density polyethylene.

Therefore, there remains a need for a commercial process which will improve the processability of metallocene-made thermoplastic polymers, especially metallocene-made ethylene-α-olefin copolymers, particularly metallocene-made low density ethylene-α-olefin copolymers.

SUMMARY OF THE INVENTION

The present invention relates to a mixture of about 85.0–99.9 wt % of metallocene-made thermoplastics, particularly metallocene-made low density polyethylene, and about 0.1–15.0 wt % of poly-1-butene polymer. The metallocene-made thermoplastics are substantially melt incompatible with poly-1-butene. The present invention further relates to the use of a minor amount of poly-1-butene for improving the processability or extrusion efficiency of a metallocene-made thermoplastics, particularly metallocene-made low density polyethylene, by adding about 0.1–15 wt % of poly-1-butene to the metallocene-made thermoplastics which are melt incompatible with the poly-1-butene prior to processing.

This use of minor amount of poly-1-butene provides an improved processability and improved extrusion efficiency of the parent polymer, using less power and significantly increases polymer throughput in the extrusion process without significantly diminishing the properties of the parent polymer. The poly-1-butene appears to lubricate the polymer melt and, because it is incompatible with the thermoplastic, continues to operate at the surface of the blend. This novel process may be used to more efficiently recycle waste thermoplastic polymers by allowing a wide diversity of polymer grades to be melt processes with less concern for their melt processability.

The poly-1-butene is a homopolymer or copolymer containing more than 50 mole % butene-1 having a melt index of from about 10 to about 1000 dg/min, preferably having a melt index of from about 20 to about 650, more preferably from about 100 to about 500 dg/min, as determined by ASTM D-1238 condition E, at 190° C.

DESCRIPTION OF THE EMBODIMENTS

While the present invention is described in connection with preferred embodiments, it will be understood that it is not intended to limit the invention to those embodiments. On the contrary, it is intended to cover all alternatives, modifications, and equivalents as may be included within the spirit and scope of the invention as defined by the appended claims.

The present invention is directed to a metallocene-made thermoplastic composition having from about 0.1–15.0 wt %, preferably from about 0.1 to about 10 wt %, more preferably from about 1 to about 7%, still more preferably from about 2 to about 5%, of a poly-1-butene polymer. The thermoplastic composition has improved processability or extrusion efficiency than the thermoplastic without the poly-1-butene polymer. The present invention is further directed to the use of a minor amount of poly-1-butene for improving the processability or extrusion efficiency of a metallocene-made thermoplastics, particularly metallocene-made low density polyethylene, by adding about 0.1–15 wt %, preferably from about 0.1 to about 10 wt %, more preferably from about 1 to about 7%, still more preferably from about 2 to about 5%, of poly-1-butene to the metallocene-made thermoplastics which are melt incompatible with the poly-1-butene prior to processing in an extruder. This resulted in an increase in extruder throughput rate, decrease in extruder back pressure and decrease in energy consumption.

The metallocene-made thermoplastics referred to herein are any thermoplastics made by metallocene catalysts which are incompatible in the melt with poly-1-butene. As a specific embodiment of the present invention, the metallocene-made thermoplastic is a low density polyethylene, more specifically a copolymer of ethylene with an alpha olefin comonomer having from 4–12 carbon atom. As a more specific embodiment of the present invention, a ethylene/1-octene copolymer(s), ethylene/1-propene/1-octene terpolymer(s), and mixture thereof, made by a metallocene catalyst is used. As a still more specific embodiment of the present invention, a metallocene-made low density polyethylene purchased from Dow Chemical Company identified as Affinity FM 1570, which is an ethylene-octene copolymer, is used as the parent thermoplastic.

Metallocene catalysts, also referred to as constrained geometry catalysts, are characterized as having a single, stable chemical type rather than a volatile mixture of states as discussed for conventional Ziegler-Natta catalysts. This results in a system composed of catalyst positions which have a singular activity and selectivity. For this reason, metallocene catalyst systems are often referred to as "single site" owing to the homogeneous nature of them, and polymers and copolymers produced from them are often referred to as single site resins by their suppliers.

Generally speaking, metallocene catalysts are organometallic compounds comprising a metal coordination complex comprising a metal of groups 3–10 or the Lanthanide series of the Periodic Table of the Elements, preferably a metal of groups 3–6, and especially a metal of groups 4 and 5, such as hafnium, titanium, vanadium, or zirconium, and a delocalized pi-bonded moiety substituted with a constrain-inducing moiety, such as one or more cyclopentadienyl ligands. A cocatalyst, such as but not limited to, oligometric methyl alumoxane is often used to promote the catalytic activity. By varying the metal component and the cyclopentadienyl ligand a diversity of polymer products may be tailored having molecular weights ranging from about 200 to greater than 1,000,000 and molecular weight distribution from 1.5 to about 15. The choice of co-catalyst influences the efficiency and thus the production rate, yield, and cost.

Exxon Chemical in U.S. Pat. No. 4,701,432 sets out examples of which olefin catalyst systems are of the metallocene class and which are non-metallocene. They cite bis(cyclopentadienyl) dichloro-transition metal, bis (cyclopentadienyl)methyl, chloro-transition metal, and bis (cyclopentadienyl)dimethyl-transition metal as examples of metallocene catalysts, where the metals include choices such as titanium, zirconium hafnium, and vanadium. The patent further provides examples of non-metallocene catalysts as being $TiCl_4$, $TiBr_4$, $Ti(OC_4H_9)_2Cl_2$, $VC_{14}$, and $VOCl_3$.

As a consequence of the single site system afforded by metallocenes, olefinic copolymers, such as ethylene/alpha-olefin copolymers, can be produced with each polymer chain having virtually the same architecture. Therefore, the copolymer chains produced from single site systems are uniform not only in chain length, but also in average comonomer content, and even regularity of comonomer spacing, or incorporation along the chain.

In contrast to Ziegler-Natta catalyst made polymers, these single site metallocene polymers are characterized as having a narrow MWD and narrow compositional distribution (CD). While conventional polymers have MWD's of about 3.5 to 8.0, metallocene-made polymers range in MWD from about 1.5 to about 2.5 and most typically about 2.0. MWD refers to the breadth of the distribution of molecular weights of the polymer chains, and is a value which is obtained by dividing the number-average molecular weight into the weight-average molecular weight. The low CD, or regularity of side branches chains along a single chain and its parity in the distribution and length of all other chains, greatly reduces the low MW and high MW "tails". These features reduce the extractables which arise from poor LMW control as well as improve the optics by removing the, e.g. linear, ethylene-rich portions which are present in conventional heterogeneous resins.

Thus, conventional Ziegler-Natta systems produce heterogeneous resins which reflect the differential character of their multiple catalyst sites while metallocene systems yield homogeneous resins which, in turn, reflect the character of their single catalytic site.

Another distinguishing property of single site catalyzed ethylene copolymers is manifested in their melting point range. The narrow CD of metallocenes produces a narrow melting point range as well as a lower Differential Scanning Calorimeter (DSC) peak melting point peak. Unlike conventional resins which retain a high-melting point over a wide density range, metallocene resin melting point is directly related to density. For example, an ethylene/butene copolymer having a density of 0.905 g/cc produced using a metallocene catalyst has a peak melting point of about 100° C., while a slightly lower density ethylene/butylene copolymer which was made using a conventional Ziegler catalyst reflects its heterogeneous nature with a melting point at about 120° C. DSC shows that the Ziegler resin is associated with a much wider melting point range and actually melts at higher temperatures despite its lower density.

In recent years, several resin suppliers have been researching and developing metallocene catalyst technology. The following are patent literature disclosing nonelimiting illustrative examples of metallocene catalysts which are suitable for use in preparing the thermoplastics of the present invention and processes of preparing metallocene-made thermoplastics, the teaching of which are incorporated herein by reference.

Dow in EP 416,815 disclosed the preparation of ethylene/ olefin copolymers using monocyclopentadienylsilane complexed of a transition metal. The homogeneous ethylene copolymers which may be prepared using this catalyst are said to have better optical properties than typical ethylene polymers and be well suited for film or injection molding.

Wellborn in Exxon U.S. Pat. No. 4,306,041 discloses the use of metallocene catalysts to produce ethylene copolymers which have narrow molecular weight distributions.

Chang, in Exxon U.S. Pat. No. 5,088,228 discloses the production of ethylene copolymers of 1-propene, 1-butene, 1-hexene, and 1-octene using metallocene catalysts.

Exxon in U.S. Pat. No. 4,935,397 discloses the production of ethylene copolymers using metallocene catalysts to manufacture polymer suitable for injection molding or thermoforming.

Wellborn, in Exxon U.S. Pat. No. 5,084,534 discloses the use of bis (n-butylcyclopentadienyl) zirconium dichloride to produce high molecular weight polyethylene having a polydispersity of 0.8 and a density of 0.955/cc.

In Exxon U.S. Pat. No. 3,161,629 a cyclopentadienyl complex is disclosed which may be used to produce polyolefins having controlled molecular weight and density suitable for use in extrusion of injection molding.

Canich in Exxon U.S. Pat. Nos. 5,055,438 and 5,057,475 discloses the use of mono-cylcopentadienyl catalysts having a unique silicon bridge which may be employed to select the stereo-chemical structure of the polymer. Catalysts such as methyl, phenyl, silyl, tetramethylcyclopentadienyl-terbutylamido-zirconium dichloride may be used to produce polyethylene and ethylene copolymers suitable for films and fibers.

Mitsui Toatsu in JP 63/175004 employed bis (cylcopentadienyl)ethoxy-ZrCl to prepare homogeneous ethylene copolymers.

Mitsubishi in JP 1,101,315 discloses the use of bis (cyclopentadienyl) $ZrCl_2$ for the preparation of ethylene butene copolymers.

Dow Chemical in WO 93/13143 discloses an ethylene/ alpha-olefin interpolymer products comprising a first homogeneous ethylene polymer, specifically a copolymer of ethylene and 1-octene, made with a titanium metallocene catalyst and a second homogeneous ethylene/alpha-olefin copolymer, specifically a copolymer of ethylene and 1-octene, made with a zirconium metallocene catalyst.

As one specific embodiment of the present invention, the metallocene-made thermoplastics are polyolefins produced by polymerizing ethylene with an alpha-olefin having from 4 to 12 carbon atoms, optionally one or more other alpha-olefin(s) having from 3 to 12 carbon atoms, in the presence of metallocene catalysts which achieve a density from 0.860 to 0.930, particularly from about 0.860 to about 0.920, a molecular weight distribution of less than 4, particularly less than 3, and good distribution of ethylene and from about 0% to about 40%, particularly from about 8% to about 30%, by weight of an alpha-olefin comonomer having from 4 to 12 carbon atoms, and optionally from about 0% to about 40% by weight of one or more other alpha-olefin(s) having from 3 to 12 carbon atoms such as propylene. The metallocene-made polyolefins are produced as described in U.S. Pat. Nos. 5,322,728 and 5,272,236 which descriptions are incorporated by reference herein. Such metallocene polyolefins are available from Dow Chemical Company under the trademarks ENGAGE and AFFINITY (ethylene/octene copolymers) and from EXXON Chemical Company under the trademark EXACT (ethylene/butene copolymers).

The polymerization process for making the metallocene-made thermoplastics may be accomplished, although not limited to, at conditions well known in the prior art for Ziegler-Natta or Kaminsky-Sinn type polymerization reactions, that is, temperatures from 0° to 250° C. and pressures from atmospheric to 1000 atmospheres (100 MPa). Suspension, solution, slurry, gas phase or other process conditions may be employed if desired. A support may be employed but preferably the catalysts are used in a homogeneous manner. It will, of course, be appreciated that the active catalyst system, especially nonionic catalysts, form in situ if the catalyst and the cocatalyst components thereof are added directly to the polymerization process and a suitable solvent or diluent, including condensed monomer, is used in said polymerization process. It is, however, preferred to form the active catalyst in a separate step in a suitable solvent prior to adding the same to the polymerization mixture.

The melt incompatible metallocene-made thermoplastic polymers include styrenic block copolymers, polyolefins, polyesters, polyurethanes, polyketone, polyamides, polycarbonates, poly-4-methyl-pentene, polyimides, polysulfones, polyketones, polyphenylene oxide, ethylene vinyl alcohol, polybinyl chloride, polyacetals, polystyrene, and similar polymers and copolymers.

The metallocene-made thermoplastic polymers usable herein can be either homopolymers or copolymers. If copolymers are used, they can be binary copolymers, ternary copolymers or terpolymers, or copolymers with 4 or more monomers; they can be random or block copolymers.

As a specific embodiment of the present invention, thermoplastic polymers useful in the present invention have a melt index of less than 60, more specifically from about 0.1–15, as measured by ASTM D-1238, condition E at 190° C.

The polybutylene referred to herein is at least one butene-1 polymer containing from 90% preferably from 95% and more preferably from 97% by weight of isotactic portions. For example, isotactic poly-1-butenes having a low molecular weight, e.g. less than about 280,000 as determined by solution viscosity in "Decalin" (decahydronaphthalene) may be used. Suitable poly-1-butenes have a density of from 0.900 to 0.925, preferably from 0.905 to 0.920 and most preferably from 0.910 to 0.915. Suitable poly-1-butenes have melt indices in the range of from 10 to 1000, more preferably from 20 to 650, and most preferably from 100 to 500 dg/min, as determined by ASTM D-1238 Condition E, at 190° C. The intrinsic viscosity of the poly-1-butene may range from 0.03 to 0.20, preferably from 0.06 to 0.11 at 130° C.

A butene-1 polymer (PB) usable herein is either a butene-1 homopolymer or a copolymer or a terpolymer. If a butene-1 copolymer is used, the non-butene comonomer content is from 1 to 50%, preferably from 1 to 30 mole % of either ethylene, propylene, or an alpha olefin having from 5 to 8 carbon atoms. The poly-1-butenes can be modified to increase surface activity by reaction with, for example, maleic anhydride.

Suitable poly-1-butenes can be obtained, for example, in accordance with Ziegler-Natta low-pressure polymerization of butene-1, e.g. by polymerizing butene-1 with catalysts of $TiCl_3$ or $TiCl_3$-$AlCl_3$ and $Al(C_2H_5)_2Cl$ at temperatures of 10°–100° C., preferably 20°–40° C., e.g. according to the process described in DE-A-1,570,353. High melt indices are obtainable by further processing the polymer by peroxide cracking, thermal treatment or irradiation to induce scissions leading to a higher melt flow material.

Duraflex® DP0800, a polybutylene polymer produced by Shell Chemical Company, of Houston, Tex. is a particularly suitable polymer. This polymer is a homopolymer with a melt index of 200 g/10 min. at 190° C. and a molecular weight of 108,000.

Duraflex® DP0400, a polybutylene polymer produced by Shell Chemical Company, of Houston, Tex. is another suitable polymer. This polymer is a homopolymer with a melt index of 20 g/10 min. at 190° C. and a molecular weight of 202,000.

A preferred method uses 2–5% by weight of a butene-1 homopolymer having a melt index equal to or greater than 20, and 95–98% by weight of a metallocene-made thermoplastic, e.g. an low density ethylene-octene copolymer.

Blending of the components can occur by, for example, dry tumble blending, masterbatch, or melt compounding techniques. The method of combining the ingredients of the formulation is important. For example, in most cases, it is desirable to use the least amount of energy to merge the components into an effective blend. Therefore, the preferred method of blending is dry blending the component.

The invention will be illustrated by the following illustrative embodiments which are provided for illustration purpose only and are not intended to limit the scope of the instant invention.

ILLUSTRATIVE EMBODIMENTS

Blends were prepared from using Affinity FM 1570, low density polyethylene made by metallocene, available from Dow Chemical Company, Duraflex® PB0400 poly-1-butene homopolymer and Duraflex® DP0800 poly-1-butene homopolymer, available from Shell Chemical Company, Houston, Tex. The components were dry blended before extruding.

The physical properites of Duraflexe®DP0800 and Duraflex®PB0400 are listed in TABLE I and TABLE II below, and that of Affinity FM 1570 are listed in TABLE III below.

TABLE I

Typical Physical Properties of DP0800 Poly-1-butene

| Property | ASTM Test Method | Polybutylene DP0800 Units English | Metric |
|---|---|---|---|
| Melt Index @ 190° C. | D1238 "E" | — | 200 g/10 min |
| Density | D1505 | 57.1 lb/ft | 0.915 g/cm$^3$ |
| Tensile strength @ yield | D638 | 2000 psi | 13.8 MPa |
| Tensile strength @ break | D638 | 4200 psi | 29.0 MPa |
| Elongation at break | D638 | — | 350% |
| Modulus of elasticity | D638 | 35000 psi | 241 MPa |
| Hardness, Shore | D2240 | — | 55 D Scale |
| Brittleness temperature | D746 | 0° F. | −18° C. |
| Melting point range | DSC | 225–259° F. | 124–126° C. |
| Soft point, Vicat | D1525 | 241° F. | 116° C. |
| Thermal conductivity, at 25° C. (77° F.) | C177 | 1.25 Btu/ft$^2$/hr/°F./in | 16K cal/m$^2$/hr/°C./cm |

TABLE II

Polybutylene PB0400 Typical Physical Properties*

| Property | ASTM Test Method | English Unit | Value | S.J. Unit | Value |
|---|---|---|---|---|---|
| Melt Index | D 1238 "E" | — | — | g/10 min | 20 |
| Density | D 1505 | lb/ft$^3$ | 57.1 | g/cm$^2$ | 0.915 |
| Tensile strength, at yield | D 638 | psi | 2000 | MPa | 14 |
| Tensile strength, at break | D 638 | psi | >3200 | MPa | >23 |
| Elongation, at break | D 638 | >350 | >350 | | |
| Modulus of elasticity | D 638 | psi | 3.5 × 10$^4$ | MPa | 250 |
| Hardness, Store | D 2240 | D Scale | 55 | D Scale | 55 |
| Environmental stress crack resistance | D 1693 | Hours | No failure** | Hours | failure** |
| Brittleness temperature | D 746 | °F. | 0 | °C. | −18 |
| Melting point, range | DTA | °F. | 255–259 | °C. | 124–126 |

*Compression molded samples, conditioned 10 days at 73° F. (22.8° C.).
**15,000 hours at 50° C., 10% Igepal C0030

TABLE III

Physical Properties of Affinity FM1570

| Physical Properties | Test Method | Values[1] |
|---|---|---|
| Percent Comonomer, octene | Dow[2] | 7.5 |
| Melt Index, dg/min | ASTM D-1238 | 1.0 |
| Density, gm/cc | ASTM D-792 | .915 |
| DSC Melting Point, °F. (°C.) | Dow | 226 (108) |
| Dow Rheology Index (DRI) | Dow[3] | 4.9 |
| Film Properties, 2.0 mil (51 microns)[4] | | |
| Puncture Resistance, ft-lb/in$^3$ (J/cm$^3$) | Dow | 320 (26.5) |
| Dart Impact, g (Method B) | ASTM D-1709 | 550 |
| Elmendorf Tear Strength, g (Type A) | | |
| MD | ASTM D-1922 | 360 |
| CD | ASTM D-1922 | 760 |
| Ultimate Tensile, psi (MPa) | | |
| MD | ASTM D-882 | 7,460 (51.4) 6,370 |
| CD | ASTM D-882 | (43.9) |

TABLE III-continued

Physical Properties of Affinity FM1570

| Physical Properties | Test Method | Values[1] |
|---|---|---|
| Ultimate Elongation, % | | |
| MD | ASTM D-882 | 640 |
| CD | ASTM D-882 | 670 |
| Clarity | ASTM D-1746 | 81 |
| Gloss, 45° | ASTM D-2457 | 78 |
| Haze, % | ASTM D-1003 | 4.9 |
| Seal Initiation Temp., °F. (°C.) | Dow | 212 (100) |

[1]These are typical properties only, and are not tobe regarded as sales specifications.
[2]Based on ASTM D-2238, Method B.
[3]A calculated value based on complex viscosity that expresses the relative influence of long chain branching on the extrudability of homogeneous (single site catalyst) polyolefins.
[4]Blown film extruded at 420° F. (216° C.), 2.5:1 BUR 70 mil (1.8 mm) die gap.
[5]Temperature at which 2 lb/in (8.9N/25.4 microns) heat seal strength is achieved.

In TABLES IV–VII below, the blends and control were extruded using a Brabender Extruder with temperatures at zone 1 of 403°–407° F., zone 2 of 413°–417° F., Zone 3 of 416°–421° F., die temperature of 416°–419° F., melt temperature of 416°–417° F. The results are recorded in TABLES III–VII below.

In TABLEs IV–VI, the extruder back pressures and electric currents (amperages) required for the extrusion of the blends containing poly-1-butene (DP0800 or PB0400) were compared with that of controls (pure metallocene made LDPE). As can be seen from the data, using the claimed process with a small amount of poly-1-butene added to the metallocene-made LDPE (FM 1570), the extruder back pressures and the electric currents required for the extrusion are significantly reduced, when compared with the controls of pure metallocene-made LDPE.

In Table VII, extruder throughput rates were compared at constant back pressure. The blends containing poly-1-butene have significantly increased throughputs compared with controls with 100% Affinity FM1570.

Therefore, the data shows the addition of poly-1-butene significantly improves the processability and extrusion efficiency of the metallocene-made LDPE.

TABLE IV

60 RPM Extrusion for Metallocene-Made LDPE + Poly-1-butene

| | BACK PRESSURE (psi) | CURRENT AMP |
|---|---|---|
| Control (100% Affinity FM1570) | 850 | 12 |
| 97.5% FM1570 + 2.5% DP0800 | 650 | 9 |
| 95.0% FM1570 + 5.0% DP0800 | 600 | 10 |
| 97.5% FM1570 + 2.5% PB0400 | 700 | 9.5 |
| 95.0% FM1570 + 5.0% PB0400 | 700 | 8.5 |

TABLE V

80 RPM Extrusion for Metallocene-Made LDPE + Poly-1-butene

| | BACK PRESSURE (psi) | CURRENT AMP |
|---|---|---|
| Control (100% Affinity FM1570) | 1000 | 14 |
| 97.5% FM1570 + 2.5% DP0800 | 850 | 10 |
| 95.0% FM1570 + 5.0% DP0800 | 800 | 12 |
| 97.5% FM1570 + 2.5% PB0400 | 750 | 10 |
| 95.0% FM1570 + 5.0% PB0400 | 900 | 10.5 |

TABLE VI

100 RPM Extrusion for Metallocene-Made LDPE + Poly-1-butene

| | BACK PRESSURE (psi) | CURRENT AMP |
|---|---|---|
| Control (100% Affinity FM1570) | 1250 | 16 |
| 97.5% FM1570 + 2.5% DP0800 | 1000 | 13 |
| 95.0% FM1570 + 5.0% DP0800 | 900 | 14 |
| 97.5% FM1570 + 2.5% PB0400 | 1000 | 14 |
| 95.0% FM1570 + 5.0% PB0400 | 1000 | 12.5 |

TABLE VII

Throughput Enhancement of Metallocene-Made LDPE by Poly-1-butene

| | BACK PRESSURE (psi) | THROUGHPUT lb/hr |
|---|---|---|
| Control (100% Affinity FM1570) | 850 | 30.31 |
| 97.5% FM1570 + 2.5% DP0800 | 850 | 44.41 |
| Control (100% Affinity FM1570) | 1000 | 42.11 |
| 97.5% FM1570 + 2.5% DP0800 | 1000 | 60.04 |
| 97.5% FM1570 + 2.5% PB0400 | 1000 | 58.42 |
| 95.0% FM1570 + 5.0% PB0400 | 1000 | 63.03 |
| 97.5% FM1570 + 2.5% DP0800 (2nd experiment) | 1000 | 63.91 |

The ranges and limitations provided in the instant specification and claims are those which are believed to particularly point out and distinctly claim the instant invention. It is, however, understood that other ranges and limitations that perform substantially the same function in substantially the same manner to obtain the same or substantially the same result are intended to be within the scope of the instant invention as defined by the instant specification and claims.

I claim:

1. A method for improving extrusion efficiency of a metallocene-made thermoplastic polymer, which method comprises adding from about 0.1–15.0 wt % of a poly-1-butene polymer, based on combined weight of the metallocen-made thermoplastic polymer and poly-1-butene polymer, having a melt index of from about 10 to about 1000 dg/min. as determined by ASTM D-1238 Condition E at 190° C. to the thermoplastic polymer prior to extrusion of the thermoplastic polymer.

2. The method as described in claim 1, wherein said metallocene-made thermoplastic polymer is a polyolefin having (i) a density from 0.860 to 0.930, (ii) a molecular weight distribution of less than 4, (iii) from about 0% to about 40% by weight, based on total molecular weight of the polyolefin, of an alpha-olefin comonomer having 4 to 12 carbon atoms, and (iv) optionally from about 0% to about 40% by weight, based on total molecular weight of the polyolefin, of one or more other alpha-olefin(s) having 3 to 12 carbon atoms.

3. The method as described in claim 1, wherein said metallocene-made thermoplastic polymer is a polyolefin having (i) a density from 0.860 to 0.920, (ii) a molecular weight distribution of less than 3, (iii) from about 8% to about 30% by weight, based on the total molecular weight of the polyolefin, of an alpha-olefin comonomer having 4 to 12 carbon atoms, and (iv) optionally from about 0% to about 40% by weight, based on the total molecular weight of the polyolefin, of one or more other alpha-olefin(s) having 3 to 12 carbon atoms.

4. The method as described in claim 1, wherein said metallocene-made thermoplastic is a low density ethylene-octene copolymer.

5. The method as described in claim 1, wherein from about 0.1 to about 10 wt % of poly-1-butene polymer, based on combined weight of poly-1-butene and the metallocene-made thermoplastic polymer, having melt index of from about 20 to about 650 dg/min. as determined by ASTM D-1238 Condition E at 190° C. is added to the thermoplastic polymer.

6. The method as described in claim 1, wherein from about 1.0 to about 7.0 wt % of poly-1-butene polymer, based on combined weight of poly-1-butene and the metallocene-made thermoplastic polymer, having melt index of from about 100 to about 500 dg/min. as determined by ASTM D-1238 Condition E at 190° C. is added to the thermoplastic polymer.

7. The method as described in claim 1, wherein said thermoplastic polymer has a melt index of from about 0.1 to about 15 dg/min. as measured by ASTM D-1238, condition E at 190° C.

* * * * *